US009347567B2

(12) United States Patent
Kim et al.

(10) Patent No.: US 9,347,567 B2
(45) Date of Patent: May 24, 2016

(54) VALVE FOR VEHICLE

(75) Inventors: Jae Yeon Kim, Hwaseong-si (KR); Wan Je Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 617 days.

(21) Appl. No.: 13/315,031

(22) Filed: Dec. 8, 2011

(65) Prior Publication Data

US 2012/0285149 A1  Nov. 15, 2012

(30) Foreign Application Priority Data

May 13, 2011  (KR) ........................ 10-2011-0045179

(51) Int. Cl.
| G05D 23/02 | (2006.01) |
| F16K 17/38 | (2006.01) |
| F16K 1/40 | (2006.01) |
| F16K 11/02 | (2006.01) |
| F16K 31/00 | (2006.01) |

(52) U.S. Cl.
CPC ................. *F16K 1/40* (2013.01); *F16K 11/022* (2013.01); *F16K 31/002* (2013.01); *G05D 23/025* (2013.01); *F01P 2070/02* (2013.01)

(58) Field of Classification Search
CPC ....... F16K 1/40; F16K 31/002; F16K 11/022; G05D 23/025; F01P 2070/02
USPC ............ 236/101 R, 101 D, 101 A, 93 R, 103, 236/12.12, 12.11; 137/3, 87.03
See application file for complete search history.

(56) References Cited

U.S. PATENT DOCUMENTS

| 6,253,837 B1 | 7/2001 | Seiler et al. |
| 2002/0069655 A1* | 6/2002 | Lee et al. .......................... 62/222 |
| 2010/0314457 A1* | 12/2010 | Todaka et al. .............. 236/12.16 |

FOREIGN PATENT DOCUMENTS

| CN | 1357699 A | 7/2002 |
| CN | 101568756 A | 10/2009 |
| CN | 101629653 A | 1/2010 |
| EP | 1 302 711 A1 | 4/2003 |
| JP | S 59-54788 (A) | 3/1984 |
| JP | S 59-58280 (A) | 4/1984 |
| JP | 59-119921 U | 8/1984 |
| JP | 60-43122 U | 3/1985 |
| JP | 60-101278 (U) | 7/1985 |
| JP | 60151484 A * | 8/1985 |
| JP | 60-175889 (A) | 9/1985 |
| JP | 2-211324 A | 8/1990 |
| JP | 2001099348 A * | 4/2001 |
| JP | 2004204713 A * | 7/2004 |
| JP | 2010-528229 A | 8/2010 |
| KR | 10-2010-0035500 A | 4/2010 |

* cited by examiner

*Primary Examiner* — Allen Flanigan
*Assistant Examiner* — Kun Kai Ma
(74) *Attorney, Agent, or Firm* — Morgan, Lewis & Bockius LLP

(57) ABSTRACT

A valve apparatus for the vehicle that may be disposed in a vehicle to exhaust operating fluid, which flows therein, to the outside, may include a main body that has at least one exhaust port and input port and the operating fluid flows there in through the input port, and an opening/closing unit that may be disposed in the main body, wherein the opening/closing unit selectively fluid-connects one of the at least a exhaust port with the input port according to a temperature of the operating fluid such that the inflow operating fluid may be exhausted to the outside through the exhaust port.

10 Claims, 12 Drawing Sheets

(S10)

(S20)

(S100)

(S200)

VALVE FOR VEHICLE

CROSS-REFERENCE TO RELATED APPLICATION

The present application claims priority to Korean Patent Application No. 10-2011-0045179 filed in the Korean Intellectual Property Office on May 13, 2011, the entire contents of which is incorporated herein for all purposes by this reference.

BACKGROUND OF THE INVENTION

1. Field of the Invention

The present invention relates to a valve for a vehicle. More particularly, the present invention relates to a valve for a vehicle that uses a simple structure to open or close an outlet thereof according to the temperature of an inflow operating fluid.

2. Description of Related Art

Generally, a valve is disposed in a pipe line or a container to receive a fluid such as air, gas, liquid, and water from the outside, to exhaust them, to cut off the flow of the fluid, or to control a flowing amount and a pressure of the fluid.

The valve controls the flow of fluid by operating a valve seat where the fluid flows through a valve stem and handle, and a separate temperature adjustment device is used to detect the temperature of the fluid flowing past the valve seat to be able to remotely control the valve.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a valve for a vehicle having advantages of using a simple structure to open or close an exhaust port according to the temperature of operating fluid that flows therein.

Also, various aspects of the present invention are directed to providing a valve for a vehicle having advantages of saving manufacturing cost by simplifying constituents elements compared to a conventional wax expansion type of valve, reducing weight, improving responsiveness of a valve according to an operating fluid temperature, reducing flow resistance to maintain fluid exhaust amount, and improving reliability of fluid control.

In an aspect of the present invention, a valve apparatus for the vehicle that is disposed in a vehicle to exhaust operating fluid, which flows therein, to the outside, may include a main body that may have at least one exhaust port and input port and the operating fluid flows therein through the input port, and an opening/closing unit that is disposed in the main body, wherein the opening/closing unit selectively fluid-connects one of the at least a exhaust port with the input port according to a temperature of the operating fluid such that the inflow operating fluid is exhausted to the outside through the exhaust port.

The opening/closing unit may include a mounting cap that is fixedly mounted to an end portion in the main body, and a transformation member of which one end thereof is connected to the mounting cap that is inserted into the main body to be expanded or contracted according to the temperature of the operating fluid, wherein the transformation member is disposed close to the at least one exhaust port.

The transformation member is a shape memory alloy material that expands or contracts according to the temperature of the operating fluid.

The transformation member may include fixed portions that are formed in both end portions of the length direction in the transformation member to not be transformed by the temperature, wherein one of the first portions is connected to the mounting cap, and a transformation portion that is formed between the fixed portions and expands or contracts according to the temperature.

The transformation member may have a structure in which a circular coil spring overlaps itself such that coils thereof contact each other according to the temperature.

The mounting cap may include an insert portion of which one end thereof is inserted into the transformation member, and a mounting portion of which one end thereof is integrally connected to the other end of the insert portion and is mounted on an interior circumference of the main body.

The mounting portion may have external threads that are formed on an exterior circumference to be engaged on an interior circumference of the main body.

The mounting portion may have a catching portion that is integrally formed on the other end thereof to be fixed on an outside end portion of the main body.

The catching portion may include a tool recess that is formed on the other end thereof.

The catching portion may include a tool recess that is formed on the other end thereof.

The transformation member may include an end cap that is mounted to be slidably inserted into the main body.

The end cap may have a penetration hole that corresponds to a pressure that varies according to a flowing amount of the operating fluid that flows in through the input port and bypasses the inflow operating fluid to the inside of the transformation member so as to improve temperature responsiveness of the transformation member.

One end of the main body is closed and the other end thereof is opened to may have a cylindrical pipe shape, and the opening/closing unit is mounted on the opened portion thereof.

The valve apparatus operates in a 2-way valve type in which one exhaust port is formed in an opposite side of the input port in the main body and the opening/closing unit is disposed close to the one exhaust port.

The valve apparatus operates in a 3-way valve type in which first and second exhaust ports are formed at opposite sides of the input port to be selectively opened or closed by the opening/closing unit, wherein the opening/closing unit is disposed close to either of the first and second exhaust ports.

The at least one exhaust port of the valve may include a first exhaust port that is formed across the input port in the main body and selectively receive the operating fluid from the input port, a second exhaust port that is formed at an opposite side of the input port to be connected to a supply portion such that the operating fluid is selectively exhausted therethrough from the input port, and a return port formed at an opposite side of the input port to return the operating fluid from the second exhaust port to the first exhaust port, wherein first and second opening/closing units are disposed close to the first and second exhaust ports respectively, and wherein the first, second, and return ports are selectively opened or closed by the first and second opening/closing units.

The main body may have a cylindrical pipe shape of which both ends thereof are opened, and the first and second opening/closing units are disposed at both sides to respectively open or close the second exhaust port and the return port.

As described above, a valve for a vehicle according to an exemplary embodiment of the present invention uses a simple structure thereof to selectively open or close the exhaust port according to the temperature of the operating fluid that flows therein and effectively exhausts the operating fluid, wherein the constituent elements are simplified compared to a conventional wax expansion type of valve, the production cost is reduced, and simultaneously the weight thereof is reduced.

Also, the responsiveness of the opening/closing operation of the valve according to the temperature of the operating fluid is improved, the flow resistance of the operating fluid in the valve is reduced to uniformly maintain the fluid exhaust amount, the reliability of the flowing control is improved, and the coolant flow is smoothly maintained in a case that the operating fluid is a coolant such that the cooling performance thereof is improved and the power consumption of the water pump is reduced.

Also, the interior structure is simplified by reducing the number of constituent elements to save manufacturing cost, to reduce weight, and make the maintenance thereof easy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
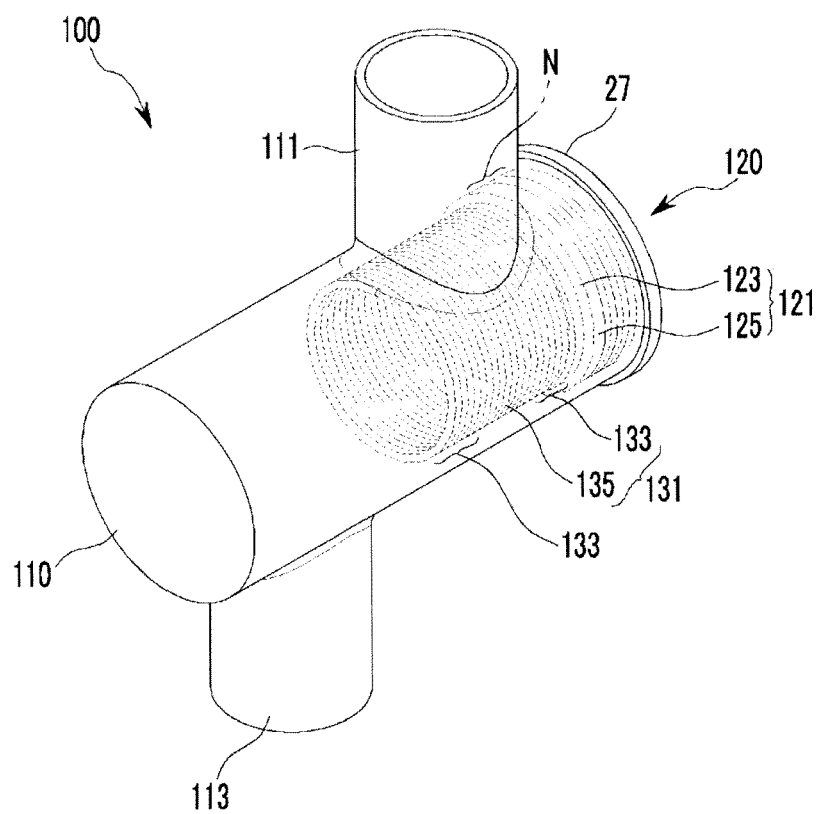
FIG. 1 is a perspective view of a valve for a vehicle according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
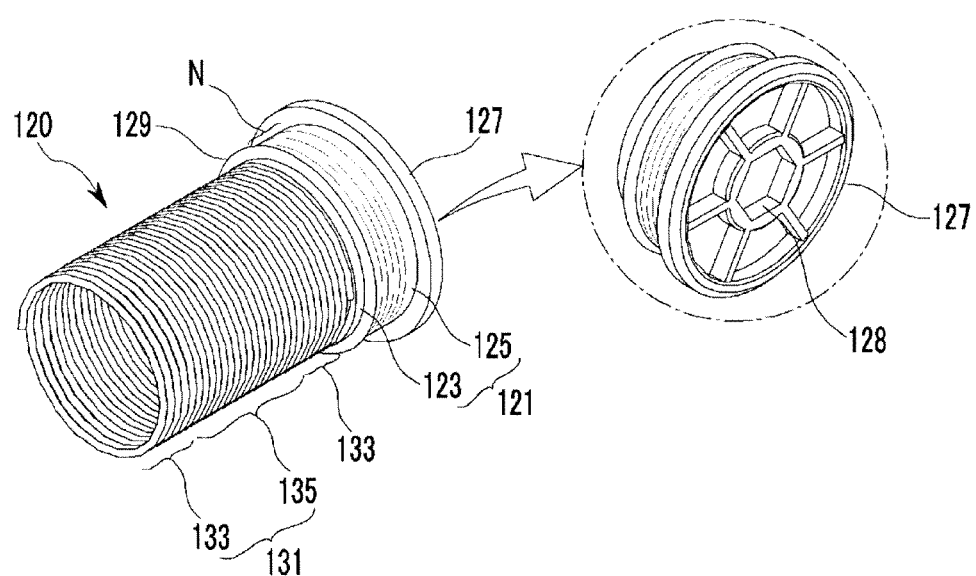
FIG. 2 is a perspective view of an opening/closing unit that is applied to a valve of a vehicle according to the various exemplary embodiments of the present invention.
Figure 3:
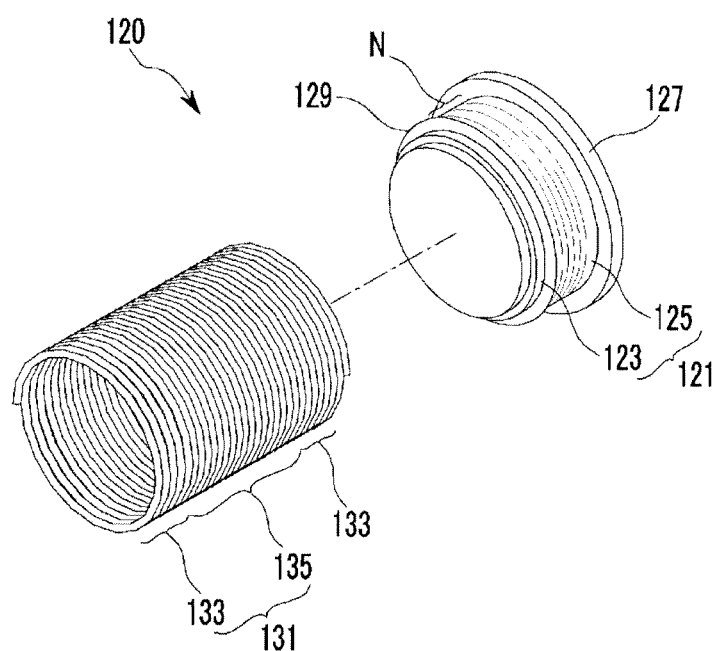
FIG. 3 is an exploded perspective view of an opening/closing unit according to the various exemplary embodiments of the present invention.
Figure 4:
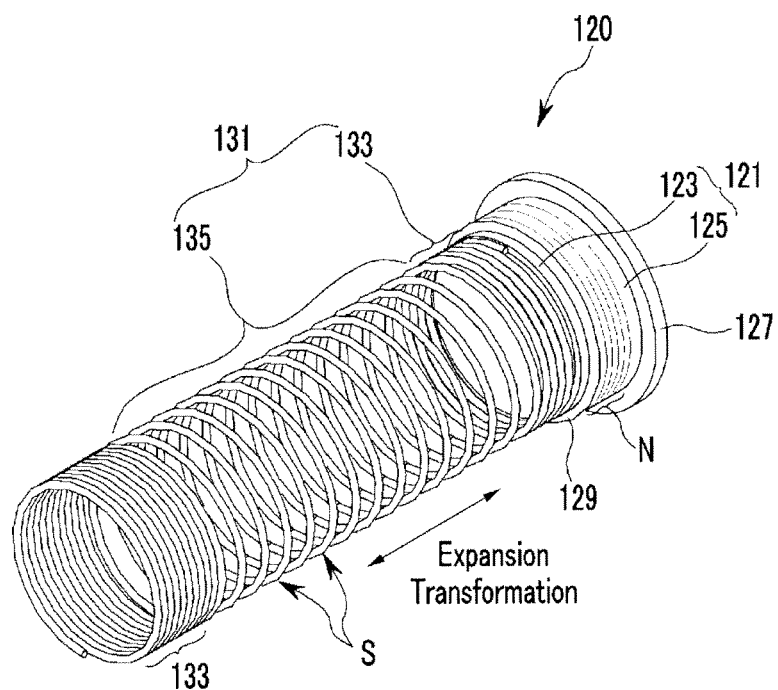
FIG. 4 is an operating condition diagram of an opening/closing unit according to the various exemplary embodiments of the present invention.
Figure 5:
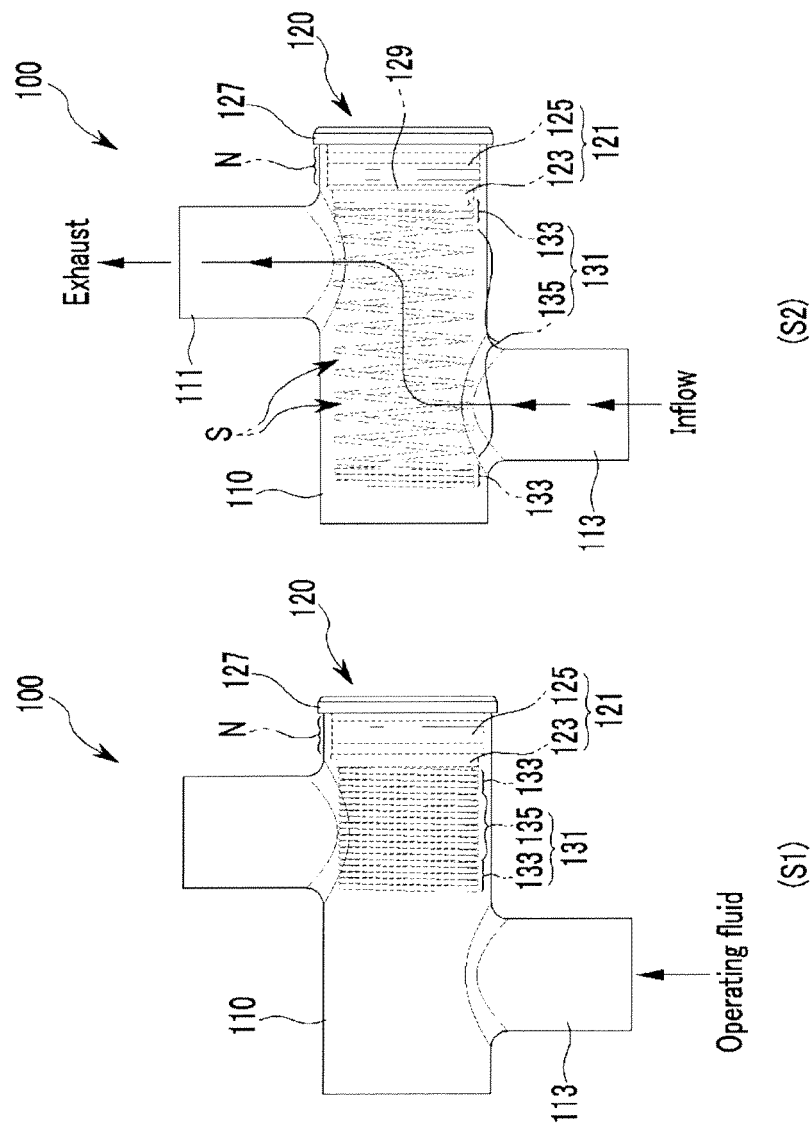
FIG. 5 is a phased operating condition diagram of a valve for a vehicle according to the various exemplary embodiments of the present invention.

FIG. 1 is a perspective view of a valve for a vehicle according to a first exemplary embodiment of the present invention, FIG. 2 is a perspective view of an opening/closing unit that is applied to a valve of a vehicle according to the first exemplary embodiment of the present invention, FIG. 3 is an exploded perspective view of an opening/closing unit according to the first exemplary embodiment of the present invention, FIG. 4 is an operating condition diagram of an opening/closing unit according to the first exemplary embodiment of the present invention, and FIG. 5 is a phased operating condition diagram of a valve for a vehicle according to the first exemplary embodiment of the present invention.

Referring to the drawings, a valve 100 for a vehicle according to a first exemplary embodiment of the present invention uses a simple structure to selectively open/close an exhaust port 111 according to the temperature of an operating fluid that flows therein such that the operating fluid is exhausted.

Also, the present invention provides a valve for a vehicle having advantages of saving manufacturing cost by simplifying constituents elements compared to a conventional wax expansion type of valve, reducing weight, improving responsiveness of a valve according to an operating fluid temperature, reducing flow resistance to maintain fluid exhaust amount, and improving reliability of fluid control.

For this, as shown in FIG. 1, the valve 100 for a vehicle according to an exemplary embodiment of the present invention is disposed in a vehicle and includes a main body 110 and an opening/closing unit 120 so as to exhaust the inflow operating fluid to the outside, and each component thereof will be detailed as follows.

Firstly, the main body 110 includes at least one exhaust port 111 and one input port 113, wherein the operating fluid flows therein through the input port 113.

Here, one end of the main body 110 in a length direction is closed and the other end thereof is opened to form a cylindrical pipe, and the opening/closing unit 120 is mounted in the opened side of the main body 110.

In the present exemplary embodiment, the main body includes an input port 113 that is formed in a length direction thereof, and one exhaust port 111 is formed corresponding to the opening/closing unit that is mounted in the opened side of the main body, wherein the exhaust port 111 is spaced apart from the input port 113.

That is, the valve 100 for a vehicle according to the first exemplary embodiment of the present invention is selectively opened or closed by the opening/closing unit 120, and one exhaust port 111 is formed at an opposite side of the input port 113 in the main body 110 to be a 2-way valve type.

Further, the opening/closing unit 120 is mounted on the main body 110 to connect the exhaust port 111 with the input port 113 according to the temperature of the inflow operating fluid such that the operating fluid that flows in through the input port 113 is exhausted through the exhaust port 111.

As shown in FIG. 2 and FIG. 3, the opening/closing unit 120 includes a mounting cap 121 and a transformation member 131, and these will be described as follows.

Firstly, the mounting cap 121 is fixedly mounted at one side of a length direction of the main body 110.

Here, the mounting cap 121 includes an insert portion 123 of which one end thereof is fixedly inserted into the transformation member 131, and a mounting portion 125 of which one end is connected to the other end of the insert portion 123 and is mounted on an interior circumference of the main body 110.

External threads (N) are formed on an exterior circumference of the mounting portion 125 to be engaged with the interior circumference of the main body 110 in the present exemplary embodiment, and internal threads are formed on an interior circumference of the opened one end portion of the main body 110 corresponding to the external threads (N).

Also, the mounting portion 125 is fixedly caught on an outside end portion of the other end of the main body 110, wherein a catching portion 127 is integrally formed with the mounting portion 125 to prevent the mounting portion 125 from being inserted into the main body 110.

The catching portion 127 has a tool recess 128 that is formed on the other surface of the catching portion 127, wherein a tool is inserted into the tool recess 128 and a user uses the tool to rotate the mounting cap 121 such that the mounting portion 125 is engaged on the main body 110.

Meanwhile, the mounting portion 125 has a sealing portion 129 that prevents the inflow operating fluid from leaking between the insert portion 123 and the main body 110 in the present exemplary embodiment.

That is, the sealing portion 129 seals a gap between an interior circumference of the main body 110 and an exterior circumference of the mounting portion 125 such that the operating fluid does not leak along the external threads (N) of the mounting portion 125 that are engaged with the main body 110.

Further, one end portion of the transformation member 131 is connected to the mounting cap 120 that is inserted into the main body 110 to expand or contract according to the temperature of the operating fluid.

The transformation member 131 can be made of a shape memory alloy material that expands or contracts according to the temperature of the operating fluid.

Here, the shape memory alloy (SMA) expands or contracts at a higher temperature or a lower temperature than a predetermined temperature, but the shape memory alloy returns to the original shape when the temperature returns its original predetermined temperature.

The transformation member 131 that is made of the shape memory alloy material includes a fixed portion 133 and a transformation portion 135, and these structures will be further described as follows.

Firstly, the fixed portion 133 is fixed such that both ends portions thereof are not transformed according to the temperature, and one end side is welded to be fixed in the present exemplary embodiment.

The fixed portion 133 is connected to the mounting cap 121 that is mounted at the opened portion of the main body 110. Here, the insert portion 123 of the mounting cap 121 is inserted into an interior circumference of the fixed portion 133 to be fixed on the transformation member 131.

The transformation portion 135 is disposed across the fixed portion 133 to expand or contract according to the temperature of the operating fluid.

The transformation member 131 has a circular coil spring shape, wherein the coils are disposed to contact each other in a case that the member 131 is contracted.

That is, for the opening/closing unit 120 that is described above, as shown in FIG. 4, if the operating fluid having a predetermined temperature flows therein, the transformation portion 135 of the transformation member 131 expands to be transformed.

Accordingly, the transformation portion 135 of the transformation member 131 is expanded such that the contacting coils elongate to form a space (S), wherein the operating fluid flows through the space (S).

The fixed portion 133 is fixed by welding, and therefore it maintains its original shape.

As shown in FIG. 3, if a cool operating fluid flows into the main body 110, the transformation member 131 returns to its original shape as the transformation portion 135 contracts.

Hereinafter, operating and function of a valve 100 for a vehicle according to a first exemplary embodiment of the present invention will be detailed.

FIG. 5 is a phased operating condition diagram of a valve for a vehicle according to the first exemplary embodiment of the present invention.

Firstly, in a condition that the insert portion 123 of the mounting cap 121 is inserted into one fixed portion 133 of both fixed portions 133 that are formed at both end portions of the transformation member to be fixed, a tool is used to insert the transformation member 131 into the opened portion of the main body 110 such that the transformation member 131 is mounted in the mounting portion 125.

In this case, the transformation member 121 is disposed to close the exhaust port 111 of the main body 110. Here, the sealing portion 129 that is disposed between the insert portion 123 and the mounting portion 125 seals the gap between the main body 110 and the mounting portion 125 such that the operating fluid cannot leak between the main body 110 and the mounting portion 125.

In this condition, as shown in S1 of FIG. 5, the valve 100 for a vehicle according to the first exemplary embodiment of the present invention closes the exhaust port 111 in a case that the temperature of the operating fluid that flows therein through the input port 113 of the main body 110 is lower than a predetermined value and the transformation portion 135 of the transformation member 131 maintains its original shape.

Accordingly, the operating fluid that flows into the main body 110 is not exhausted through the exhaust port 111.

Conversely, as shown in S2 of FIG. 5, in a case that the operating fluid that flows in the main body is higher than a predetermined value, the transformation portion 135 of the transformation member 131 expands to form a space (S) between the coils.

Accordingly, the exhaust port 111 is opened, the operating fluid flows through the space (S) in the transformation portion 135 to be exhausted through the exhaust port 111.

Meanwhile, while the transformation portion 135 is expanded to open the exhaust port 111, if the operating fluid of a low temperature flows therein, the transformation portion 135, as shown in S1 of FIG. 5, is contracted to close the exhaust port 111.

That is, through the above operation, the transformation member 131 of the opening/closing unit 120 of the valve 110 for a vehicle according to the first exemplary embodiment of the present invention selectively opens or closes the exhaust port 111 according to the temperature of the operating fluid that flows therein.

Accordingly, if the valve 100 for a vehicle is applied to the first exemplary embodiment of the present invention, the valve has a simple structure, wherein the opening/closing unit 120 including the mounting cap 121 and the transformation member 131 of a shape memory alloy material is used to selectively open or close the exhaust port 111 according to the temperature of the operating fluid so as to exhaust the operating fluid, and the number of constituent elements is reduced, the production cost is saved, and the weight is reduced compared to a conventional wax expansion type of valve.

Also, since the transformation member 131 of the shape memory alloy material is used for the opening/closing operation of the valve according to the temperature of the operating fluid, the flowing resistance of the operating fluid in the valve 100 is reduced to uniformly maintain the fluid exhaust amount, the reliability of the flowing control is improved, and the coolant flow is smoothly maintained in a case that the operating fluid is a coolant such that the cooling performance thereof is improved and the power consumption of the water pump is reduced.

Also, the number of constituent elements is reduced to simplify the interior structure such that the production cost is saved, the weight is reduced, and the maintenance becomes easy.

Figure 6:
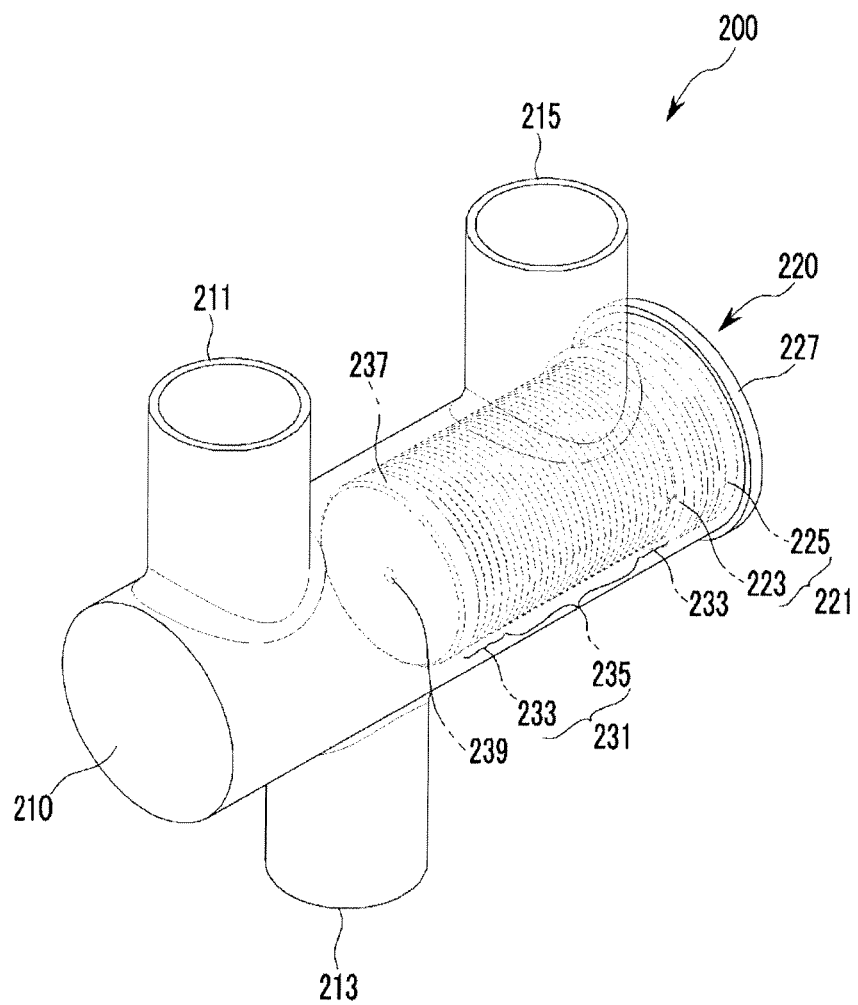
FIG. 6 is a perspective view of a valve for a vehicle according to a various exemplary embodiments of the present invention.
Figure 7:
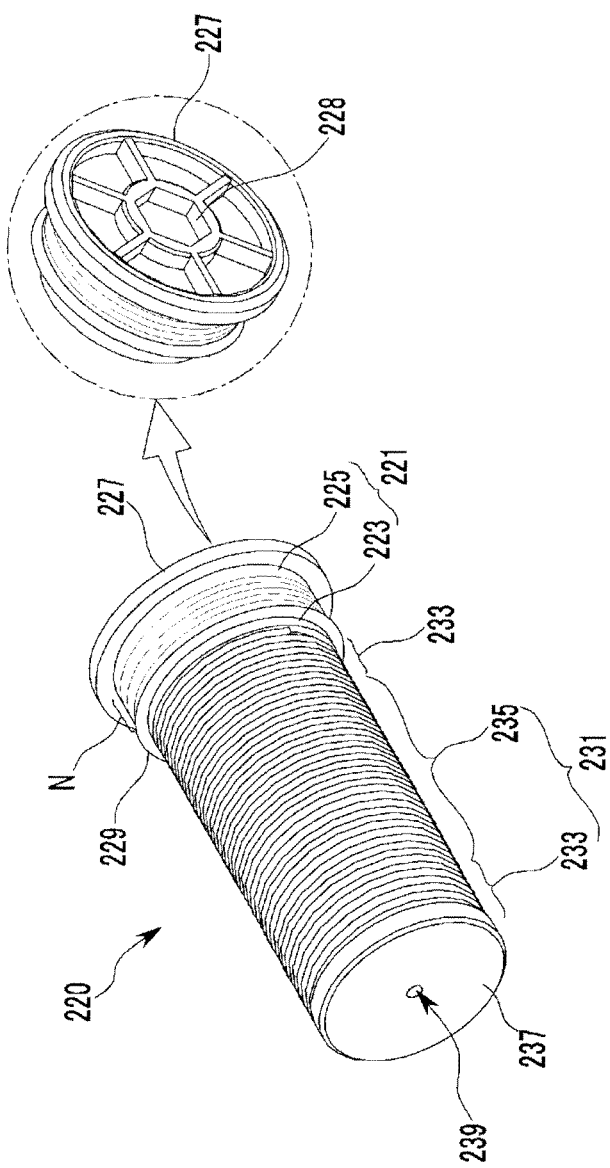
FIG. 7 and FIG. 8 are a perspective view and an exploded perspective view of an opening/closing unit that is applied to a valve for a vehicle according to the various exemplary embodiments of the present invention.
Figure 8:
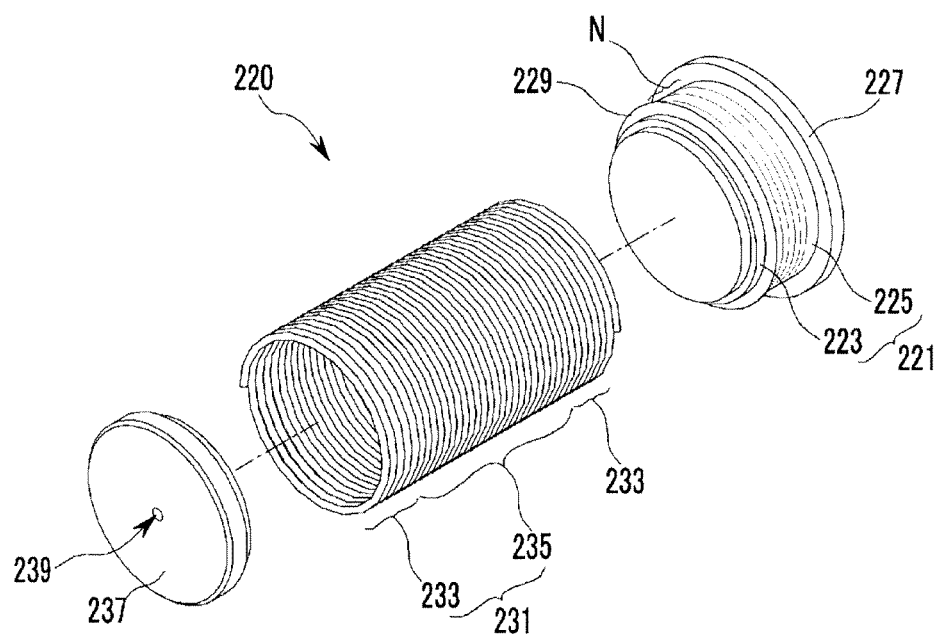
Figure 9:
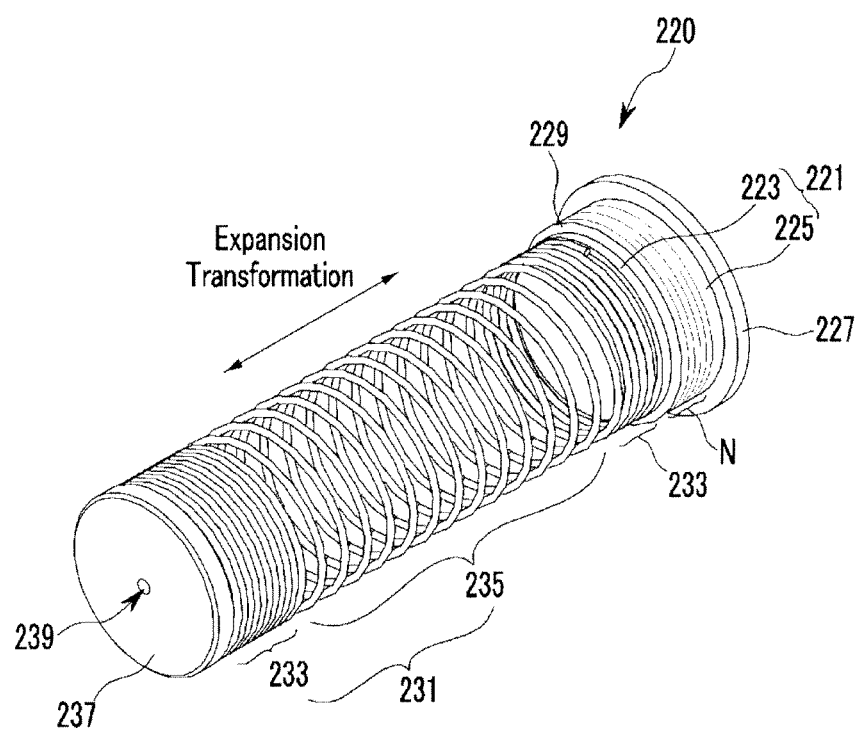
FIG. 9 is an operating condition diagram of an opening/closing unit according to the various exemplary embodiments of the present invention.

FIG. 6 is a perspective view of a valve for a vehicle according to a second exemplary embodiment of the present invention, FIG. 7 and FIG. 8 are a perspective view and an exploded perspective view of an opening/closing unit that is applied to a valve for a vehicle according to the second exemplary embodiment of the present invention, and FIG. 9 is an operating condition diagram of an opening/closing unit according to the second exemplary embodiment of the present invention.

Referring to the drawings, a valve 200 for a vehicle according to the second exemplary embodiment of the present invention selectively opens or closes the exhaust port 211 according to the temperature of the operating fluid to exhaust the operating fluid.

Also, the present invention provides a valve for a vehicle having advantages of saving manufacturing cost by simplifying constituents elements compared to a conventional wax expansion type of valve, reducing weight, improving responsiveness of a valve according to an operating fluid temperature, reducing flow resistance to maintain fluid exhaust amount, and improving reliability of fluid control.

For this, as shown in FIG. 6, the valve 200 for a vehicle according to an exemplary embodiment of the present invention is disposed in a vehicle and includes a main body 210 and an opening/closing unit 220 so as to exhaust the inflow operating fluid to the outside, and each of the components thereof will be detailed as follows.

Firstly, the main body 210 includes at least one exhaust port 211 and one input port 213, wherein the operating fluid flows therein through the input port 213.

Here, one end of the main body 210 in a length direction is closed and the other end thereof is opened to have a cylindrical pipe shape, and the opening/closing unit 220 is mounted in the opened side of the main body 210.

In the present exemplary embodiment, the input port 213 is formed at one side of a length direction of the main body 210, the first exhaust port 211 is formed at an opposite direction of the input port 213 at a closed end thereof, and a second exhaust port 215 is formed spaced apart from the first exhaust port 211 in an opposite direction of the input port 213.

That is, the first and second exhaust ports 211 and 215 are formed in the opposite direction of the input port 213 with a predetermined distance from each other, and the valve 200 is selectively closed or opened by the opening/closing unit 220 to be a 3-way valve.

The opening/closing unit 220 is mounted in the main body 210 to selectively connect the input port 213 with the first and second exhaust ports 211 and 215 according to the temperature of the inflow operating fluid such that the operating fluid is exhausted to the outside of the main body 110.

As shown in FIG. 6 and FIG. 7, the opening/closing unit 120 includes a mounting cap 221 and a transformation member 231, and these will be described as follows.

Firstly, the mounting cap 221 is fixedly mounted at one side of a length direction of the main body 210.

Here, the mounting cap 221 includes an insert portion 223 of which one end thereof is fixedly inserted into the transformation member 231, and a mounting portion 225 of which one end is connected to the other end of the insert portion 223 and is mounted on an interior circumference of the main body 210.

External threads (N) are formed on an exterior circumference of the mounting portion 225 to be engaged with the interior circumference of the main body 210 in the present exemplary embodiment, and internal threads are formed on an interior circumference of the opened one end portion of the main body 210 corresponding to the external threads (N).

Also, the mounting portion 225 is fixedly caught on an outside end portion of the other end of the main body 210, wherein a catching portion 227 is integrally formed with the mounting portion 225 to prevent the mounting portion 225 from being inserted into the main body 210.

The catching portion 227 has a tool recess 228 that is formed on the other surface of the catching portion 227, wherein a tool is inserted into the tool recess 228 and a user uses the tool to rotate the mounting cap 221 such that the mounting portion 225 is engaged on the main body 210.

Meanwhile, the mounting portion 225 has a sealing portion 229 that prevents the inflow operating fluid from leaking between the insert portion 223 and the main body 210 in the present exemplary embodiment.

That is, the sealing portion 229 seals a gap between an interior circumference of the main body 210 and an exterior circumference of the mounting portion 225 such that the operating fluid does not leak along the external threads (N) of the mounting portion 225 that are engaged with the main body 210.

Further, one end portion of the transformation member 231 is connected to the mounting cap 221 that is inserted into the main body 210 to expand or contract according to the temperature of the operating fluid.

The transformation member 231 can be made of a shape memory alloy material that expands or contracts according to the temperature of the operating fluid.

The transformation member 231 that is made of the shape memory alloy material includes a fixed portion 233 and a transformation portion 235, and these structures will be further described as follows.

Firstly, the fixed portion 233 is fixed such that both ends portions thereof are not transformed according to the temperature, and one end is welded to be fixed in the present exemplary embodiment.

The fixed portion 233 is connected to the mounting cap 221 that is mounted at the opened portion of the main body 210. Here, the insert portion 223 of the mounting cap 221 is inserted into an interior circumference of the fixed portion 233 to be fixed on the transformation member 231.

The transformation portion 235 is disposed across the fixed portion 233 to expand or contract according to the temperature of the operating fluid.

The transformation member 231 has a circular coil spring shape, wherein the coils are disposed to contact each other in a case that the member 231 is contracted.

Meanwhile, the transformation member 231 is slidably inserted into the main body 210 and an end cap 237 is disposed at one end thereof in the second exemplary embodiment of the present invention.

While the transformation member 231 of the opening/closing unit 220, which is mounted in a condition that the second exhaust port 215 is opened, is expanding or contracting, the end cap 237 is disposed on the fixed portion 233 to prevent the inflow operating fluid from being exhausted through the first exhaust port 211 together with the fixed portion 233.

Here, the end cap 237 has a penetration hole 239 bypassing the inflow operating fluid to the inside of the transformation member 231 to improve the temperature responsiveness of the transformation member and to correspond to the flowing rate of the inflow operating fluid flowing through the input port 213.

That is, the penetration hole 239 prevents the transformation member 231 from being damaged by the pressure of the operating fluid and simultaneously bypasses the inflow operating fluid in the main body 210 such that the transformation member 231 can quickly detect the temperature variation of the operating fluid.

That is, as shown in FIG. 8, in the opening/closing unit 220 having the above configuration, the transformation portion 235 of the transformation member 231 is expanded or contracted corresponding to the temperature of the operating fluid.

Accordingly, the transformation portion 235 of the transformation member 231 is expanded such that the contacting coils elongate to form a space (S), wherein the operating fluid flows through the space (S).

Here the fixed portion 233 is fixed by welding, and therefore it maintains its original shape.

As shown in FIG. 6, if a cool operating fluid flows into the main body 210, the transformation member 231 returns to its original shape as the transformation portion 235 contracts.

Hereinafter, operation and function of the valve 200 for a vehicle according to a second exemplary embodiment of the present invention will be detailed.

Figure 10:
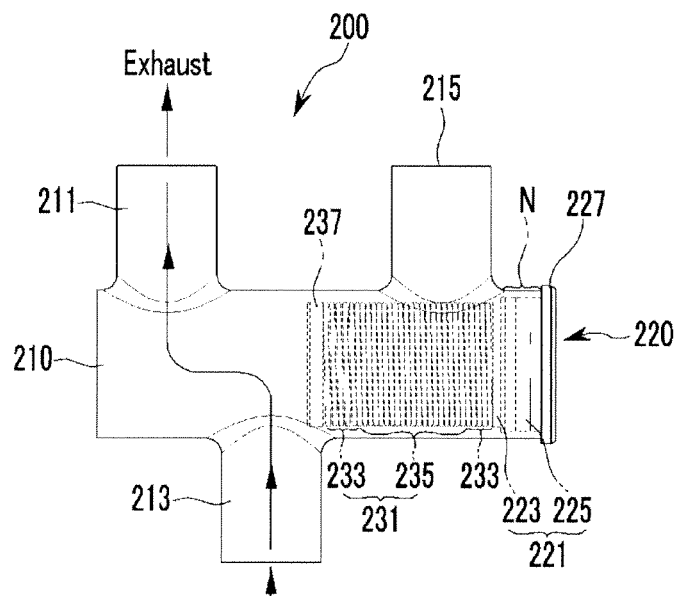
FIG. 10 is a phased operating condition diagram of a valve for a vehicle according to the various exemplary embodiments of the present invention.
Figure 10:
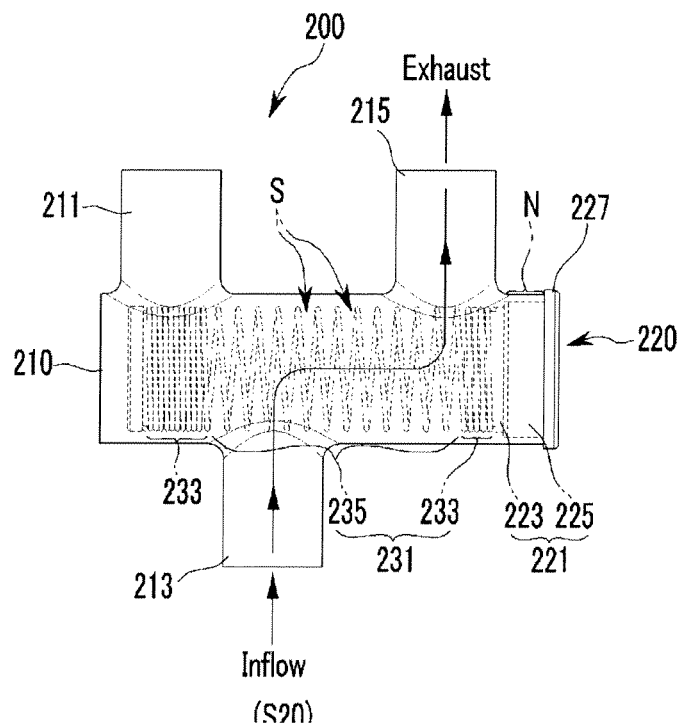

FIG. 10 is a phased operating condition diagram of a valve for a vehicle according to the second exemplary embodiment of the present invention.

Firstly, one fixed portion 233 of both side fixed portions 233 of the transformation member 231 is fixed on the insert portion 223 of the mounting cap 221, the end cap 237 is fixed on the other fixed portion 233, and a tool is used to insert the transformation member 231 into an opened portion of the main body 210 through the mounting portion 225.

In this case, the transformation member 221 is disposed to close the second exhaust port 215 within the main body 210. Here, the sealing portion 229 that is disposed between the insert portion 223 and the mounting portion 225 seals the gap between the main body 210 and the mounting portion 225 such that the operating fluid cannot leak between the main body 210 and the mounting portion 225.

In this condition, as shown in S10 of FIG. 10, the valve 200 for a vehicle according to a second exemplary embodiment of the present invention closes the second exhaust port 215 in a case that the temperature of the operating fluid that flows therein through the input port 213 of the main body 210 is lower than a predetermined value and the transformation portion 235 of the transformation member 231 maintains its original shape.

Accordingly, the operating fluid that flows into the main body 210 is exhausted through the first exhaust port 211.

Conversely, as shown in S20 of FIG. 10, in a case that the temperature of the operating fluid that flows in the main body is higher than a predetermined value, the transformation portion 235 of the transformation member 231 expands to form a space (S) between the coils.

In this case, the fixed portion 233 of the transformation member 231 where the end cap 237 is mounted closes the first exhaust port 211, the second exhaust port 215 is opened, and the operating fluid flows through the space (S) that is formed in the transformation portion 235 to be exhausted through the second exhaust port 215.

Meanwhile, in a condition that the transformation portion 235 is expanded to open the second exhaust port 215, if the cool operation fluid flow therein, the transformation portion 235 is contracted as shown in S10 of FIG. 10 to close the second exhaust port 215 and open the first exhaust port 211.

Here, the penetration hole 239 that is formed in the end cap 237 bypasses the inflow operating fluid into the transformation member 231 to correspond to the pressure variation of the operating fluid that flows therein through the input port 213 and prevents the transformation member 231 from being damaged by the pressure of the operating fluid.

At the same time, the penetration hole 239 bypasses the operating fluid into the transformation member 231 such that the transformation member 231 can quickly detect the temperature variation of the operating fluid to improve the responsiveness of the transformation member 231 according to the temperature variation.

That is, through the above operation, the transformation member 231 of the opening/closing unit 220 of the valve 210 for a vehicle according to the second exemplary embodiment of the present invention selectively opens or closes the first and second exhaust ports 211 and 215 according to the temperature of the operating fluid that flows therein.

Accordingly, if the valve 200 for a vehicle is applied to the second exemplary embodiment of the present invention, the valve has a simple structure, wherein the opening/closing unit 220 including the mounting cap 221 and the transformation member 231 of a shape memory alloy material is used to selectively open or close the exhaust ports 211 and 215 according to the temperature of the operating fluid so as to exhaust the operating fluid, and the number of constituent elements is reduced, the production cost is reduced, and the weight is reduced compared to a conventional wax expansion type of valve.

Also, since the transformation member 231 of the shape memory alloy material is used for the opening/closing operation of the valve according to the temperature of the operating fluid, the flow resistance of the operating fluid in the valve 200 is reduced to uniformly maintain the fluid exhaust amount, the reliability of the flow control is improved, and the coolant flow is smoothly maintained in a case that the operating fluid is a coolant such that the cooling performance thereof is improved and the power consumption of the water pump is reduced.

Also, the number of constituent elements is reduced to simplify the interior structure such that the production cost is reduced, the weight is reduced, and the maintenance becomes easy.

Figure 11:
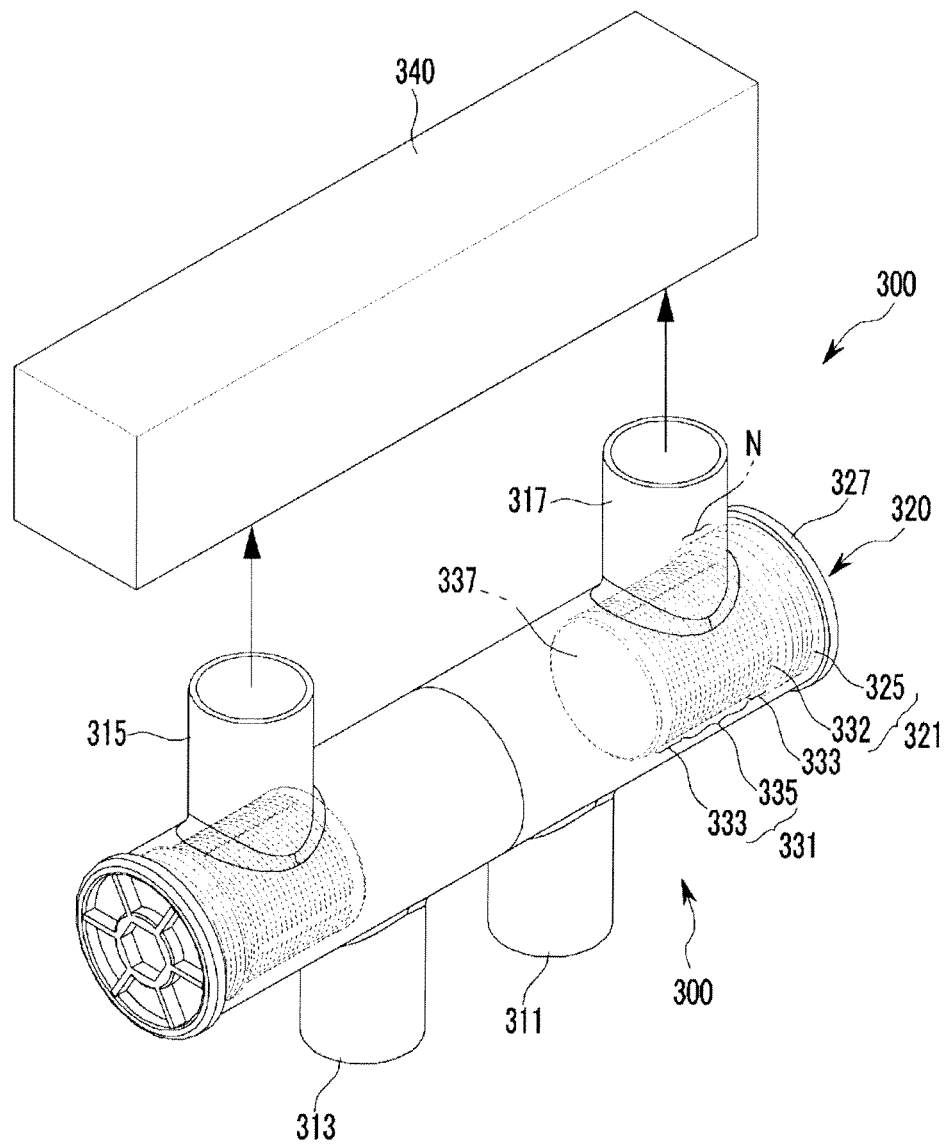
FIG. 11 is a perspective view of a valve for a vehicle according to a various exemplary embodiments of the present invention.

FIG. 11 is a perspective view of a valve for a vehicle according to a third exemplary embodiment of the present invention.

Referring to the drawings, the valve 300 for a vehicle according to the third exemplary embodiment of the present invention selectively opens or closes an exhaust port 311 according to the temperature of the operating fluid to exhaust the operating fluid.

Also, the present invention provides a valve for a vehicle having advantages of saving manufacturing cost by simplifying constituents elements compared to a conventional wax expansion type of valve, reducing weight, improving responsiveness of a valve according to an operating fluid temperature, reducing flow resistance to maintain fluid exhaust amount, and improving reliability of fluid control.

For this, as shown in FIG. 11, the valve 300 for a vehicle according to an exemplary embodiment of the present invention is disposed in a vehicle and includes a main body 310 and an opening/closing unit 320 so as to exhaust the inflow operating fluid to the outside, and each component thereof will be detailed as follows.

Firstly, the main body 310 includes at least one exhaust port 311 and one input port 313, wherein the operating fluid flows therein through the input port 313.

Here, the valve 300 according to the third exemplary embodiment of the present invention includes a first exhaust port 311 that is formed spaced apart from the input port 313 in a length direction of the main body 310, a second exhaust port 315 that is formed in the opposite side of the input port 313 to be connected to a separate supply portion 340, and a return port 317 that is formed spaced apart from the second exhaust port 315 and on the same side as the second exhaust port 315.

Here, the supply portion 340 can be a heat exchanger including a condenser.

In the present exemplary embodiment, the main body 310 has a cylindrical pipe shape of which both end portions thereof are opened, and an opening/closing unit 320 is mounted at each of the second exhaust port 315 and the return port 317 to close or open them.

That is, the valves 300 that are disposed at both sides of the main body 310 to selectively close or open the second exhaust port 315 that is connected to the supply portion 340 and the return port 317 is a 4-way valve type.

The opening/closing unit 320 is disposed in the main body 310 to selectively connect the first and second exhaust ports 311 and 315 with the return port 317 according to the inflow fluid temperature such that the inflow operating fluid can be exhausted to the outside of the main body 310.

This opening/closing unit 320 includes a mounting cap 321 and a transformation member 331, and an end cap 327 is disposed at the transformation member 331, wherein the end cap is to the same as that of the second exemplary embodiment and therefore further detailed description thereof will be omitted.

Hereinafter, operation and function of the valve 300 for a vehicle according to the third exemplary embodiment of the present invention will be detailed.

Figure 12:
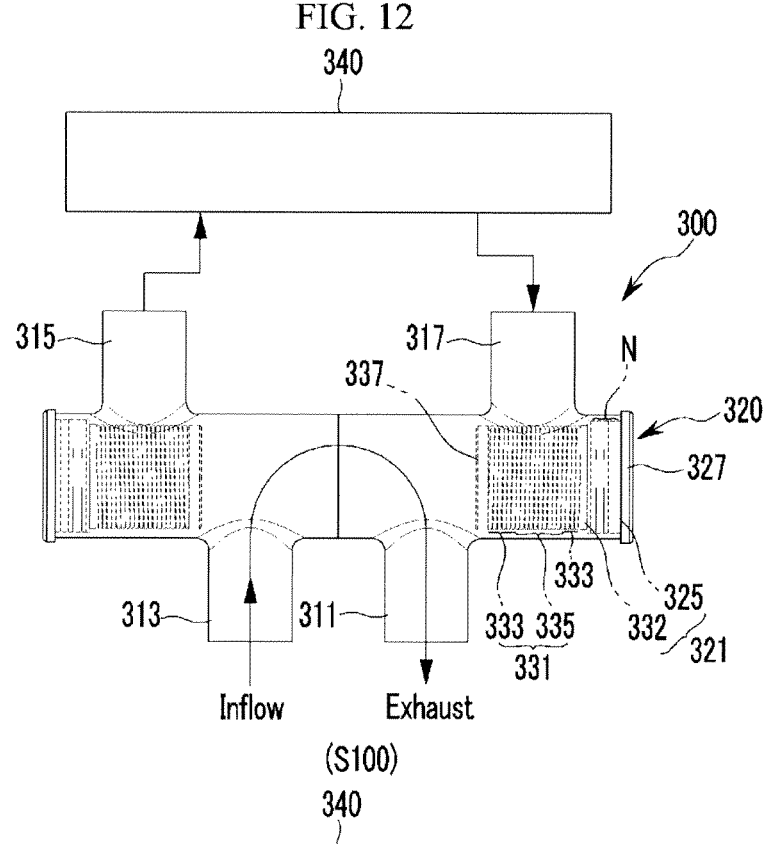
FIG. 12 is a phased operating condition diagram of a valve for a vehicle according to the various exemplary embodiments of the present invention.
Figure 12:
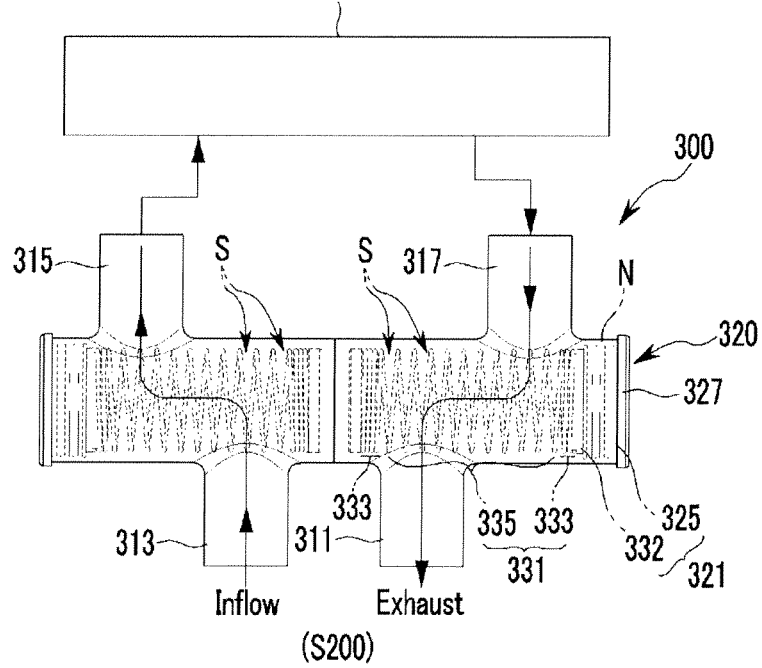

FIG. 12 is a phased operating condition diagram of a valve for a vehicle according to the third exemplary embodiment of the present invention.

Firstly, one fixed portion 333 of both fixed portions 333 of the transformation member 331 is fixed on an insert portion 323 of the mounting cap 321, the end cap 337 is fixed on the other fixed portion 333, and a tool is used to insert the transformation member 331 into an opened portion of the main body 310 through a mounting portion 325.

In this case, the transformation member 321 is disposed to close the second exhaust port 315 and the return port 317 within the main body 210. A sealing portion 329 that is disposed between the insert portion 323 and the mounting portion 325 seals the gap between the main body 310 and the mounting portion 325 such that the operating fluid cannot leak between the main body 310 and the mounting portion 325.

In this condition, as shown in S100 of FIG. 12, the valve 300 for a vehicle according to the third exemplary embodiment of the present invention closes the second exhaust port 315 and the return port 317 in a case that the temperature of the operating fluid that flows therein through the input port 313 of the main body 310 is lower than a predetermined value and the transformation portion 335 of the transformation member 331 maintains its original shape.

Accordingly, the operating fluid that flows into the main body 310 is exhausted through the first exhaust port 311.

Conversely, as shown in S200 of FIG. 12, in a case that temperature of the operating fluid that flows in the main body is higher than a predetermined value, the transformation portion 335 of the transformation member 331 expands to form a space (S) between the coils.

In this case, the fixed portions 333 where the end caps 337 are respectively mounted face each other in a central portion of the main body 310 such that the operating fluid that is exhausted through the second exhaust port 315 is prevented from being directly exhausted through the first exhaust port 311 until after it passes through the return port 317.

Accordingly, the second exhaust port 315 is opened, the operating fluid flows through the space (S) that is formed in the transformation portion 335 to be supplied to the supply portion 340, and the fluid that is supplied to the supply portion 340 flows back into the main body 310 through the return port 317.

The operating fluid that flows therein through the return port 317 is exhausted to the outside of the main body 310 through the space (S) that is formed in the transformation portion 335 and the first exhaust port 311.

Meanwhile, in a condition that the transformation portion 335 is expanded to open the second exhaust port 315, if the cool operation fluid flow therein, the transformation portion 335 is contracted as shown in S100 of FIG. 12 to close the second exhaust port 315 and the return port 317 and to open the first exhaust port 311 such that the inflow operating fluid is direct exhausted through the first exhaust port without passing through the supply portion 340.

Here, a penetration hole 339 that is formed in an end cap 337 bypasses the inflow operating fluid into the transformation member 331 to correspond to the pressure variation of the operating fluid that flows therein through the input port 313 and prevent the transformation member 331 from being damaged by the pressure of the operating fluid.

Also, the penetration hole 339 bypasses the operating fluid into the transformation member 331 such that the transformation member 331 can quickly detect the temperature variation of the operating fluid to improve the responsiveness of the transformation member 331 according to the temperature variation.

That is, through the above operation, the transformation member 331 of the opening/closing unit 320 of the valve 310 for a vehicle according to the third exemplary embodiment of the present invention selectively opens or closes the first and second exhaust ports 311 and 315 and the return port 317 according to the temperature of the operating fluid that flows therein.

Accordingly, if the valve 300 for a vehicle is applied to the third exemplary embodiment of the present invention, the valve has a simple structure, wherein the opening/closing unit 320 including the mounting cap 321 and the transformation member 331 of a shape memory alloy material is used to selectively open or close the exhaust port 311 according to the temperature of the operating fluid so as to exhaust the operating fluid, and the number of constituent elements is reduced, the production cost is reduced, and the weight is reduced compared to a conventional wax expansion type of valve.

Also, since the transformation member 331 of the shape memory alloy material is used for the opening/closing operation of the valve according to the temperature of the operating fluid, the flowing resistance of the operating fluid in the valve 300 is reduced to uniformly maintain the fluid exhaust amount, the reliability of the flowing control is improved, and the coolant flow is smoothly maintained in a case that the operating fluid is a coolant such that the cooling performance thereof is improved and the power consumption of the water pump is reduced.

Also, the number of constituent elements is reduced to simplify the interior structure such that the production cost is reduced, the weight is reduced, and the maintenance becomes easy.

Meanwhile, it is described that the transformation member is expanded at a high temperature and contracts at a lower temperature in an exemplary embodiments of the present invention, but it is not limited thereto, and the transformation member can expand at a low temperature and can contract at a high temperature.

Also, the operating fluid that flows in the valve for a vehicle according to an exemplary embodiments of the present invention can be all kinds of fluid of which the temperature thereof is varied such as an oil type or a coolant that are applied to a vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve apparatus disposed in a vehicle to exhaust operating fluid, which flows therein, to outside the vehicle, comprising:
    a main body having at least one exhaust port and an input port, the operating fluid flowing therein through the input port; and
    an opening/closing unit disposed in the main body, wherein the opening/closing unit includes:
    a transformation member selectively fluidically connecting one of the at least one exhaust port with the input port according to a temperature of the operating fluid such that the operating fluid is exhausted to the outside through the at least one exhaust port; and
    a mounting cap mounted to an end portion in the main body,
    wherein the transformation member has a first end thereof connected to the mounting cap inserted into the main body and the transformation member is expanded or contracted according to the temperature of the operating fluid, and
    wherein the transformation member includes:
    fixed portions formed in both end portions of a length direction in the transformation member to not be transformed by the temperature, wherein a first fixed portion of the fixed portions is connected to the mounting cap and a second fixed portion of the fixed portions is disposed between the input port and the at least one exhaust port; and
    a transformation portion integrally formed between the first and second fixed portions,
    wherein the transformation portion and the second fixed portion selectively and directly close either the at least one exhaust port or the input port such that the operation fluid does not flow into a fluid passage between the at least one exhaust port and the input port while the transformation portion expands or contracts according to the temperature of the operation fluid.

2. The valve apparatus for the vehicle of claim 1, wherein the transformation member is a shape memory alloy material expanding or contracting according to the temperature of the operating fluid.

3. The valve apparatus for the vehicle of claim 1, wherein the transformation member has a structure in which a circular coil spring overlaps itself such that coils thereof contact each other according to the temperature.

4. The valve apparatus for the vehicle of claim 1, wherein the mounting cap includes:
    an insert portion of which a first end thereof is inserted into the transformation member and attached thereto; and
    a mounting portion of which a first end thereof is integrally connected to a second end of the insert portion and is detachably mounted on an interior circumference of the main body.

5. The valve apparatus for the vehicle of claim 4, wherein the mounting portion has external threads formed on an exterior circumference thereof to be engaged on an interior circumference of the main body.

6. The valve apparatus for the vehicle of claim 4, wherein the mounting portion has a catching portion that is integrally formed on a second end of the mounting portion to be fixed on an outside end portion of the main body.

7. The valve apparatus for the vehicle of claim 6, wherein the catching portion includes a tool recess formed on an end thereof.

8. The valve apparatus for the vehicle of claim 4, wherein a catching portion integrally formed on the mounting portion includes a tool recess formed on an end of the catching portion.

9. The valve apparatus for the vehicle of claim 1, wherein a first end of the main body is closed and a second end thereof is opened to have a cylindrical pipe shape, and the opening/closing unit is mounted on the opened end thereof.

10. The valve apparatus for the vehicle of claim 1, wherein the valve apparatus operates in a 2-way valve type in which one exhaust port is formed in an opposite side of the input port in the main body and the opening/closing unit is disposed close to the at least one exhaust port.

* * * * *